March 14, 1950　　　S. J. BURWELL　　　2,500,659
MOTOR SCOOTER FRAME AND REAR WHEEL SUSPENSION
Filed May 8, 1945　　　　　　　　　　　2 Sheets-Sheet 1
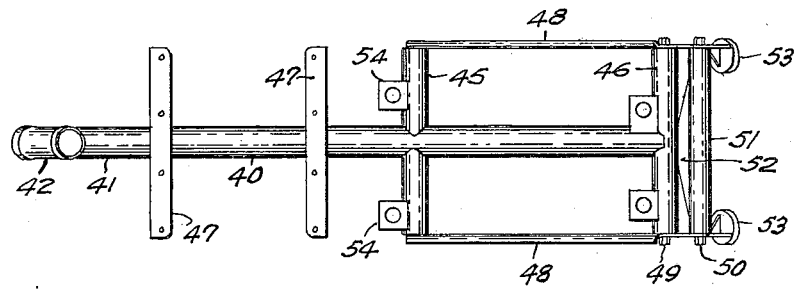
Fig.1
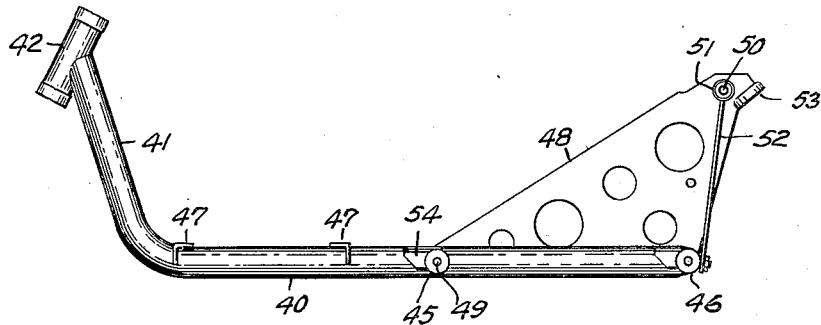
Fig.2
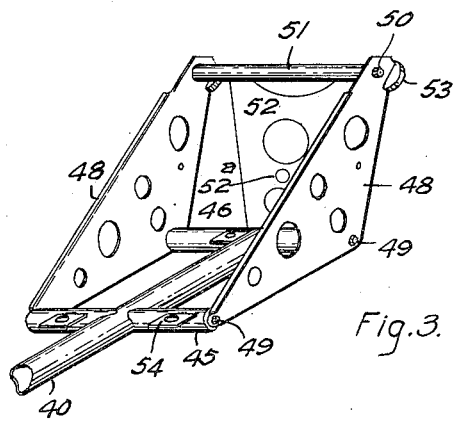
Fig.3.
Inventor
S.J. Burwell
By
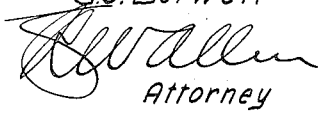
Attorney

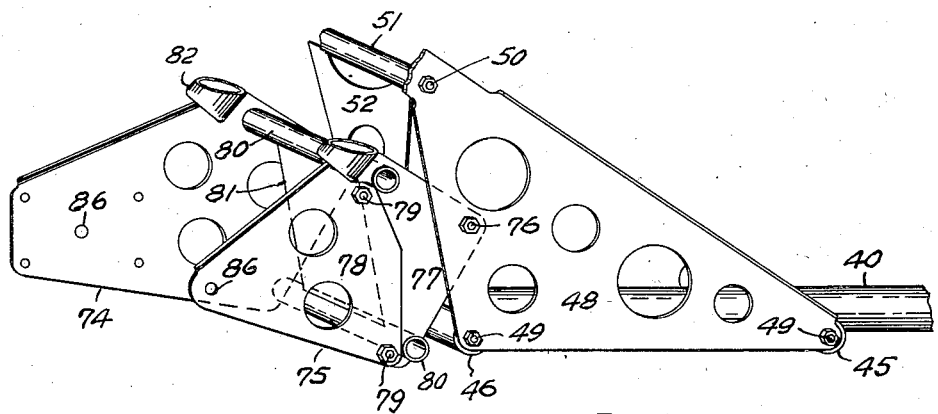
Fig. 4.
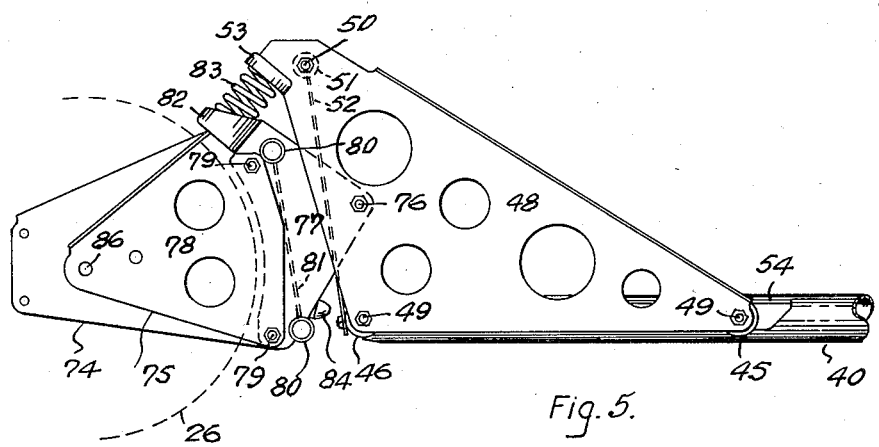
Fig. 5.
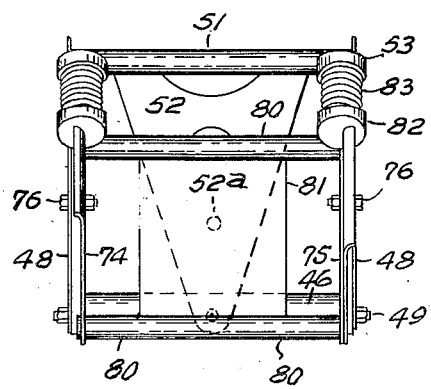
Fig. 6.
Inventor
S. J. Burwell
By
Attorney Patented Mar. 14, 1950

2,500,659

UNITED STATES PATENT OFFICE 2,500,659

MOTOR SCOOTER FRAME AND REAR WHEEL SUSPENSION

Stanley J. Burwell, Toronto, Ontario, Canada

Application May 8, 1945, Serial No. 592,580

4 Claims. (Cl. 280—285)

This invention relates to improvements in that type of motor vehicles having two wheels arranged in tandem and relates especially to the variety termed motor scooters.

The primary object of the invention is to provide a frame for vehicles of the aforesaid type which will have great strength and rigidity where these qualities are required, combined with superior flexibility and riding qualities and which will be of simple and rugged construction capable of production at relatively small cost. A further object is to provide a vehicle frame as aforesaid of articulated construction including a wheel mounting portion capable of removal from the main frame without separation of a wheel from the mounting. A still further object is to provide a vehicle frame including a cushioned wheel mounting adapted to permit removal of a wheel therefrom, in its axial direction, without disturbing the attachment and cushioning of the said mounting.

Various other objects and the advantages of the invention may be ascertained from the following description and the accompanying drawings.

The invention consists, broadly speaking, in a motor vehicle main frame of tubular, welded construction to be mounted on running wheels, the mounting means including a spring cushioned rear assembly readily detachable from the main frame and from which assembly the wheel is readily removable, said main frame and assembly forming an articulated structure; the main frame having provision for carrying a sub-frame on which the entire motive power plant may be mounted, the said main frame providing for a three point suspension of the sub-frame.

In greater detail, the invention consists in the features and combinations of features herein disclosed, together with all such modifications thereof and substitutions of equivalents therefor as are within the scope of the appended claims.

In the accompanying drawings, forming part of the disclosure herein, which illustrate that embodiment of the invention now preferred, but to the details of which the invention is not confined:

Fig. 1 is a plan view of the main frame.

Fig. 2 is a side elevation of the main frame, with side plate removed.

Fig. 3 is a perspective view of the rear portion of the main frame.

Fig. 4 is a perspective view of the rear portion of the main frame and rear wheel mounting.

Fig. 5 is a side elevation of the structure of Fig. 4.

Fig. 6 is a rear elevation of the structure of Figs. 4 and 5.

The main frame, best shown in Figs. 1, 2 and 3, comprises a preferably tubular sill member 40, the main portion of which normally lies horizontally in the central longitudinal vertical plane of the vehicle, while the forward, or arch, portion 41 extends upwardly at a contained angle of approximately 100° to the main portion. The portions 40, 41 are preferably formed integral, of a continuous bent tube, but they may be separately formed and welded together. The free, or upper, end of the arch portion 41 has fixed thereto the tubular front fork mounting 42, disposed at any suitable angle to the main portion of the sill 40, for example, at a contained angle of approximately 65°. The rear portion of the sill 40 has fixed thereto front and rear, transverse, preferably tubular transoms 45 and 46, respectively. Between the front transom 45 and the frame arch 41, the sill has fixed thereto a pair of cross members 47, which may be ordinary angle bars and which are adapted to support a floor. The elements 40 (including the part 41), 42, 45, 46 and 47 are preferably welded together so as to be rigidly related to one another. The member 40 is the back bone of the frame and has, owing to its tubular form, very high torsion resistance and great rigidity so that the main frame will not be sprung from its true form by road shocks nor readily distorted by rough usage or accident. A pair of triangular, flanged side plates 48 extend from the front transom 45 to the rear transom 46 and upwardly from the plane of the transoms and sill and are connected to the transoms by any suitable means, such as by bolts 49 passing through the transoms and side plates, with nuts retaining the side plates, or by threaded studs fixed to the ends of the transoms. The upper corners of the side plates 48, which are approximately over the rear transom 46, are connected by a bolt 50 passing through a tubular spacer 51 which extends between the plates. A sway brace 52, preferably triangular in form, is connected between the spacer 51 and the transom 46, preferably by being welded at one edge to the spacer and bolted at its apex to the medial portion of the transom 46. The upper corners of the side plates have fixed thereto spring pockets 53 opening at a downward inclination to the rear. The front transom has fixed thereto on opposite sides of the sill, apertured pads 54 to which an engine-carrying sub-frame may be bolted and the brace plate 52 is formed with an aperture 52ª over the sill, to which the rear end of the sub-frame may be secured, thus affording a three point suspension for the sub-frame and power unit thereon. The side plates 48 and brace 52 may be apertured to reduce weight.

The rear wheel mounting, best illustrated in Figs. 4 to 6 inclusive, is a frame comprising, essentially, side member 74 and 75 which may be roughly diamond shaped, as shown, and pivoted at the forward ends of their long axes to the main frame side plates 48 by bolts 76, with capacity for oscillation in vertical planes. The side member 75 is formed in two parts, namely, a forward part 77 which is pivoted to the main frame, as already described, and a rear part 78 connected to the rear edge of the forward part, in overlapping relation thereto, by bolts 79. The side member 74 and the forward part 77 of the side member 75 are connected together by upper and lower cross members 80, which are preferably tubular and welded to the side members. Means to brace the pivoted frame against torsion is provided and may consist merely of a plate 81 extending between the upper and lower cross members 80 and welded thereto. The upper edge of the side member 74 and the upper edge of the front part 77 of the side member 75 have fixed thereto spring pockets 82, normally in axial alignment with the spring pockets 53 on the main frame and helical springs 83 are mounted in compression between the pockets 82 and 53. The lower part of the plate 81 carries snubbers 84, of rubber or other suitable material, adapted to engage any suitable abutment on the main frame, such as the rear transom 46, to limit the reactive effect of the springs 83, in the well known manner. The rear wheel 26 may be mounted between the rear ends of the side members 74 and 75 on an axle which passes through apertures 86 in the side members. The axle will constitute a rigid cross connection between the rear ends of the side members 74 and 75. The inclination of the springs 83 enables them to be of ample length to afford satisfactory cushioning without inconveniently increasing the height or length of the main frame side plates 48, while the location of the springs intermediate the axle and the pivotal center of the wheel mounting frame causes the amplitude of spring movement to be considerably less than the amplitude of vertical wheel movement, so that the wheel may be permitted considerable vertical movement with consequently easy riding.

The structure of the rear wheel mounting renders removal of the wheel to change a tire, or for any other purpose, very simple, quick and easy. It is merely necessary to remove the nuts of the two bolts 79, which connect the frame parts 77 and 78. The frame part 78 may then be removed in a lateral direction. As will be seen from Fig. 5, the rear edge of the frame part 77 is formed to afford the clearance necessary for lateral removal of the wheel. It will be particularly noted that the springs 83 are not disturbed during removal of the wheel. The operation of replacing the wheel is the mere reversal of the removal operation and is as easy of accomplishment. If it is desired to remove the entire rear wheel mounting, with or without the wheel attached, this may be very easily done by removing the two pivot bolts 76, and drawing the entire frame rearwardly out of the main frame. In replacing the rear wheel mounting, it is necessary to see that the springs 83 are properly seated in their upper and lower pockets 53 and 82, respectively.

Having thus described my invention, I claim:

1. In a motor vehicle, a main frame including a single, central, longitudinal sill member; front and rear transoms and transverse floor supports fixed to said sill member; a front fork mounting fixed to the sill member; said sill member, transoms, supports and fork mounting being welded together; side plates for attachment of rear wheel mountings secured to the ends of the front and rear transoms and lying above the plane of the sill and transoms; a spacer between said side plates above the sill; a cross-tie between the side plates at the region of said spacer; and a brace plate rigidly connected to said spacer and to said rear transom.

2. In combination with structure according to claim 1, motor mounting means on the front transom on opposite sides of the sill; and motor mounting means on said brace plate substantially in the vertical longitudinal plane of the sill.

3. In a motor vehicle, a rigid frame comprising a longitudinal center sill, front and rear transoms projecting laterally from the rear portion of the sill, side plates connected to the ends of said transoms and extending upwardly from the plane of the sill and transoms; a spring frame comprising side plates pivoted to the rigid frame side plates, and cross connection between said spring frame side plates; spring means arranged in cushioning relation between the main frame and the spring frame.

4. In a motor vehicle, an articulated frame comprising a center sill, transoms fixed thereto, side frame structures spaced laterally on opposite sides of the sill, each said structures comprising a plate fixed to the transoms, a vertically oscillatable plate pivoted to the fixed plate, and a spring in compression between said fixed and oscillatable plates, one of said oscillatable plates comprising a spring abutment portion pivoted to the related fixed plate and a laterally removable rear portion removably connected to the first portion, said first portion being formed to permit removal of a wheel from between the plates, in the axial direction of the wheel and said removable portion being formed to extend beside a wheel when the same is in place between the plates and being removable without displacement of either of said springs.

STANLEY J. BURWELL.

REFERENCES CITED

The following references are of record in the file of this patent:

UNITED STATES PATENTS

| Number | Name | Date |
| --- | --- | --- |
| 578,614 | Travis | Mar. 9, 1897 |
| 1,104,501 | Heath | July 21, 1914 |
| 1,173,770 | Compton | Feb. 29, 1916 |
| 1,293,643 | Harley | Feb. 4, 1919 |
| 1,361,382 | Harmer | Dec. 7, 1920 |
| 1,511,631 | Page | Oct. 14, 1924 |
| 1,527,905 | Neracher | Feb. 24, 1925 |
| 1,707,831 | Wayerski | Apr. 2, 1929 |
| 2,071,761 | Nicholson | Feb. 23, 1937 |
| 2,077,628 | Jordan | Apr. 20, 1937 |
| 2,105,742 | Lee | Jan. 18, 1938 |
| 2,111,691 | Salsbury | Mar. 22, 1938 |
| 2,225,914 | Lewis et al. | Dec. 24, 1940 |
| 2,237,677 | Lewis | Apr. 8, 1941 |
| 2,238,208 | Anthony | Apr. 15, 1941 |
| 2,245,789 | Klavik | June 17, 1941 |
| 2,275,050 | Lewis | Mar. 3, 1942 |
| 2,286,575 | Ronning | June 16, 1942 |
| 2,348,485 | Lively | May 9, 1944 |

FOREIGN PATENTS

| Number | Country | Date |
| --- | --- | --- |
| 115,117 | Great Britain | May 2, 1918 |
| 528,018 | France | Aug. 6, 1921 |
| 547,406 | France | Sept. 20, 1922 |
| 560,328 | France | July 7, 1923 |